United States Patent Office 2,992,895
Patented July 18, 1961

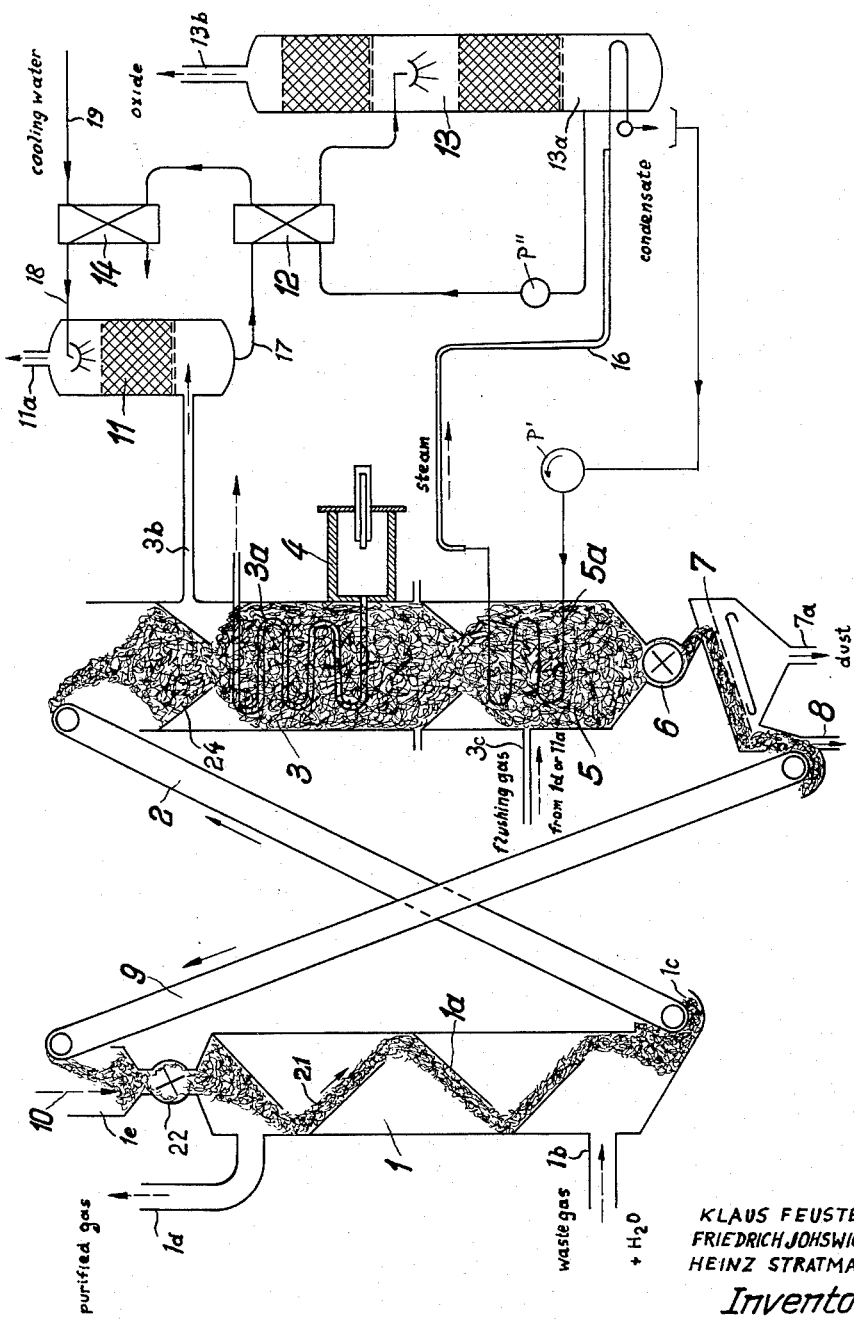

2,992,895
PROCESS FOR RECOVERING OXIDES OF NITROGEN AND SULFUR FROM GASEOUS MIXTURES
Klaus Feustel, Friedrich Johswich, and Heinz Stratmann, Essen, Germany, assignors to Firma Reinluft Gesellschaft m.b.H., Essen, Germany, a corporation of Germany
Filed Mar. 4, 1958, Ser. No. 719,125
Claims priority, application Germany Aug. 28, 1957
10 Claims. (Cl. 23—161)

Our invention relates to a process and to apparatus for the purification of industrial gases. More particularly, it is concerned with the removal by adsorption of very low concentrations of vaporous or gaseous oxides from such gases, and with the recovery of the oxides for useful purposes.

It is well known that the exit gases of various industrial processes contain only very small amounts of sulfur dioxide ($SO_2$), e.g. from the combustion of sulfur-containing coal and fuel oil, and from sulfuric-acid plants. An analogous situation exists in the case of nitric-acid production, where only slight concentrations of nitrous oxide ($N_2O$) and other nitrogen oxides such as nitric oxide (NO) and nitrogen dioxide ($NO_2$) are found in the waste gases from this process, and also with other industrial processes.

A practical and economical method of removing these oxides is desirable, not only because they are valuable chemical raw materials for industry, but also because it is vital from a public-health standpoint to eliminate even these low concentrations of the oxides from the atmosphere in order to prevent widespread damage to agricultural areas and to human well-being. Such a method should involve relatively modest costs, offset at least in part by the yield of recovered oxides from large quantities of waste gases. Moreover, such a method would be useful when it is essential to remove contaminants from special-purpose gases, e.g. protective inert gases for heating processes, gases for syntheses, etc.

Generally, the prior methods for achieving these goals—which embody the adsorption or binding of gaseous or vaporous oxides—fall into one of two principal categories, namely, dry and wet processes.

The so-called dry process is carried out by leading the impure gases over or through a solid or powdered adsorption medium, composed of such materials as the alkali hydroxides, calcined chalk (limestone), or similar substances. Purification takes place for the most part at the highest temperature of the gases, since they enter the absorption medium without previous cooling. Under these conditions, it is rarely worthwhile to regenerate the adsorption materials because of the high temperatures and large heat input required for desorption, and, as a consequence, considerable amounts of these materials soon become exhausted and turn into such relatively worthless waste products as gypsum or the like. Activated charcoal, silica, alumina, or similar materials are too high in price and deteriorate too rapidly to be practical for the adsorption of these contaminants. In addition, adsorption temperatures under 50° C. are required with these materials, hence their use would involve considerable difficulties due to moisture condensation.

The so-called wet processes are characterized by the use of aqueous solutions or organic fluids to wash the waste gases, i.e. to take up the oxides in these media. Because of their high price and also to prevent the accumulation of dirt and foreign particles, such fluids or solutions must be continually purified by means of some cyclic purification method. A very serious drawback of this process is that in the case of exit gases with a very low oxide content—less than 1 volume percent—such a large heat input is required that the process becomes completely impractical. Aside from this, the waste gases must almost always be cooled to temperatures below their condensation temperatures, such operation requiring extensive additional equipment and involving further difficulties, such as corrosion.

The principal object of this invention is to overcome the difficulties and problems of these prior methods in the removal and recovery of low concentrations of gaseous and vaporous oxides from industrial waste gases.

More particularly, it is an object of the invention to provide a dry process which is highly efficient and inexpensive, and in which these oxides are completely removed from relatively hot exit gases without the need for precooling.

Another object of this invention is the recovery of such oxides in concentrated and pure form, so that they can be utilized as chemical raw materials or for other purposes.

A further object is the purification of waste industrial gases to eliminate harmful irritants and toxic materials from them before they are discharged into and pollute the atmosphere.

A still further object is the provision of a process for the effective purification of industrial gases.

Yet another object is the recovery in pure form of by-product gases which constitute the major portion of exit gases from industrial processes, e.g. $CO_2$ from coking operations.

Our invention is based upon the discovery that gaseous or vaporous oxides, e.g. $SO_2$, NO and others, are extensively adsorbed by materials of low surface activity, such as charcoal, peat, semi-coke, lignite coke, and other organic residues from the destructive distillation of coal, when these oxides are caused to be further oxidized to higher valence states, e.g. $SO_3$, $NO_2$, etc., by reason of the presence of free oxygen or air at the effective catalytic surfaces of these adsorbents. As the adsorptive capacity of these agents for the higher-valence oxides is much greater than for those of lower valence, their effectiveness is considerably enhanced by such oxidation which can be accomplished even with a relatively low oxygen content in the exit gas, e.g. of 0.5 to 2% by volume. We have also discovered that the capacity of the normally ineffectual agents mentioned above is still further increased when water vapor is introduced into the catalyst bed simultaneously with the oxygen to form $H_2SO_4$, $HNO_3$ and the other acids corresponding to the oxides in the exit-gas stream.

Another aspect of the invention is based on the discovery that the adsorbed higher oxides are reduced to their original state or to even lower valence states when the adsorbent material is subjected to high temperatures (generally above 300° C.) in the absence of oxygen, such reduction resulting from the action of the carbon present in this material, and that in their reduced form the oxides are completely released from the adsorbent which can then be re-used for the purification of incoming waste gases.

Another feature of the invention is the provision of a cyclic, continuous process whereby a carbonaceous material adsorbs the minor gaseous or vaporous constituents of an industrial-waste-gas stream moving counter-current to the adsorbent, the latter traveling continuously to a desorption zone where these constituents are removed and subsequently recovered if this is desirable, whereupon the freshly regenerated adsorbent is continuously returned to the adsorption zone for renewed contact with the incoming waste-gas stream.

The invention will be further described with reference to the accompanying drawing whose sole figure is a diagrammatic illustration of a system for separating admixed oxides from waste gases.

An adsorption column 1 is provided in its interior with obliquely placed metal sheets 1a that are approximately perpendicular to each other and are arranged in a staggered or zig-zag fashion. Successive sheets 1a are spaced from each other to enable the passage of an adsorbent carbonaceous material 21, in powdered or granular form, from a hopper 1e at the top of the column to an outlet 1c at its bottom. A valve 22 controls the flow of the adsorbent 21 which travels down the column counter-current to a waste-gas stream to be purified, the gas entering the column through an inlet tube 1b. The gas stream has added to it sufficient oxygen (at least 0.5%) to accomplish the oxidation of the lower oxides therein to their higher valence forms, thereby greatly increasing the adsorptive capacity of the material 21. The gas, which at this stage may have a temperature up to about 200° C., may also contain water vapor for the purpose previously set forth. The purified gas, free of oxides, passes out through an exit tube 1d to a flue or to some utilization device.

At 2 there is schematically shown a transporting mechanism, such as a bucket conveyor, which picks up the oxide-laden adsorbent (having at this stage a preferred particle size of 3–10 mm.) at the outlet 1c and delivers it to a funnel 24 at the upper end of a desorption apparatus 3. This apparatus consists of an upright chamber with a heating coil 3a extending through the upper part of the chamber. An oil burner 4 provides hot exhaust smoke which passes throught the coil, thereby heating the enriched carbonaceous material 21 to the desorption temperature ranging between 300° C. and 600° C. It is important to exclude oxygen or air from the desorption chamber. The desorption is aided by a flushing gas which enters the chamber at its lower end by means of a tube 3c.

The high temperatures in the upper part of the desorption chamber 3 promotes a reduction of the higher-valence oxides by the carbonaceous matter present in the adsorbent material. This reduction proceeds approximately as follows:

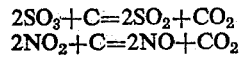

Since it is necessary to cool the adsorbent to about 200° C. before it can be re-used in column 1, and, furthermore, since it is also desirable to conserve the sensible heat extracted for this purpose, a heat exchanger 5 is provided at the lower portion of the desorption chamber 3 to enable the utilization of the excess heat from the adsorbent in heating water in pipes 5a. The developing steam passes through a conduit 16 to a heat sink, such as a separation column 13 employed at the final stage of the process, and the resulting condensate is recirculated through pipes 5a by a pump P'. The cooled adsorbent, whose movement is controlled by a discharge valve 6, passes from the bottom end of the heat exchanger 5 onto a vibrating screen 7 which permits the removal of dust, rubble and ashes from the carbon reduction process by means of a chute 7a. A portion of the regenerated carbonaceous material may be drawn off at 8 for other uses, e.g. for the removal of resinous substances from coke gas. The main portion of the adsorbent is picked up by a conveyor 9 and returned to adsorption column 1 to restart the cycle as previously described. Fresh adsorbent may be added to hopper 1e at 10, if required.

The gaseous mixture containing the flushing gas together with the desorbed gases and vapors, in which the reduced oxides are present in high concentrations (e.g. 25 to 60 volume percent), flows upward through the desorption column 3 and passes to a washer 11 by means of an exit tube 3b. At 11a the washer 11 is provided with an exit port for the washed gases. The oxides are taken up in the washing apparatus by a water spray, admitted through a conduit 18, and the aqueous solution of the oxides passes through a conduit 17 and a heat exchanger 12 to the separation column 13 which is heated by steam from the waste-heat utilizer 5. The solution, free of oxides, leaves the column at its lower end 13a and is returned by a pump P'' to the washer 11 after passing through the heat exchanger 12 and a condenser 14; the latter is cooled by water flowing through a line 19. The almost entirely pure oxide leaves column 13 at its upper end 13b and may be transferred to a sulfuric-acid plant (in the case of $SO_2$) or used for other purposes, depending on the composition of the oxide or oxides.

The flushing of the desorption chamber 3 may be effected with any gas which is free of oxygen or substantially so, such as the purified exit gas passing out of tube 1d or a portion of the deoxidized gases leaving the washer 11 at port 11a.

We have found that the oxidation of the lower oxides, in the exit-gas stream, to their higher forms can be greatly accelerated if the adsorption material, before its use, is sprayed or saturated with weak solutions of salts of iron, manganese or other metals. The use of such oxidation-promoting catalysts considerably increases the rate of adsorption.

Besides washing with water as indicated above, other industrial methods known per se can be used for the recovery of the oxides in susbtantially pure form. These methods include, for example, washing with toluidine, higher alcohols etc., or adsorption on surface-active materials. The heat required for recovery of the oxides from such media can in all instances be obtained from the excess heat given up by the adsorbent after the desorption operation, as previously described.

Another very important feature of the process of the present invention, which emphasizes its industrial practicality, is the finding that the efficiency and completeness of adsorption as well as the capacity of a low-grade carbonaceous material of limited affinity for oxides—such as incompletely carbonized anthracite coke—increase in proportion to the number of times that the material is utilized in gas purification; and that after such an adsorption medium is re-cycled three to five times, its activity equals that of the highest grades of activated carbon that are commercially available. Thus, not only is it possible to carry on the process with relatively small quantities of adsorption material, thereby lowering the heat requirement of the desorption operation and reducing the unavoidable waste (such as dust and minute particles) resulting from the mechanical rubbing and grinding that the adsorbent kernels undergo, but the process is a feasible, economical method of manufacturing highly active carbon for other industrial purposes while using the material to remove oxides or other impurities from waste gases. For example, such a highly active carbon made from cheap combustion products could be employed for the purification of solvents like benzene, for the adsorption of ethylene from coke gas, for the deodorization of waste fumes from fish-meal-processing plants, and so forth.

Considerable latitude exists in carrying out the process cycle, and there is no restriction as to how fresh additions of adsorption material are to be added to the system, nor in what manner exhausted material is to be removed, nor whether the process cycle is to be continuous or interrupted in time. The treated flue or exhaust gases may vary widely in temperature, e.g. between 100° and 200° C.

Likewise, there is a wide choice in the kinds of apparatus that are used in the process. In the adsorption operation, all conventional types of equipment can be employed that are designed for the handling of gases coming into contact with particulate solids, such as rotating drums, single- and multi-stage trays or centrifugal equipment, and the plates 1a may also be omitted if a vertical column is used as shown in the drawing. Similar equipment can be used in the desorption operation, in

We claim:

1. A process for recovering from a stream of industrial gas an oxide of a multivalent nonmetal selected from the group which consists of sulfur and nitrogen, said nonmetal having a gaseous higher oxide reducible to a gaseous lower oxide in a carbonaceous environment upon being heated above a predetermined temperature above 300° C. but below 600° C., said lower oxide occurring as a stable gas in said stream at a temperature below 300° C., which comprises the steps of moving said gas stream past a solid carbonaceous adsorbing agent, of relatively low affinity for said lower oxide and a relatively high affinity for said higher oxide, in the presence of enough oxygen to convert said lower oxide to said higher oxide, thereby causing adsorption of said higher oxide by said agent, removing the oxide-laden agent from said gas stream, and reducing the adsorbed higher oxide to its less readily adsorbed lower valence state by reacting it in its adsorbed state with some of the carbon of said agent in a substantially oxygen-free atmosphere above said predetermined temperature, thereby desorbing the lower oxide from said agent and regenerating the latter.

2. A process according to claim 1 wherein the oxygen content of the gas stream on its way to said agent is maintained at not less than substantially half a volume percent.

3. A process according to claim 1 wherein the gas stream is maintained at an elevated temperature during movement past said adsorbing agent, said elevated temperature ranging between substantially 100° and 200° C.

4. A process according to claim 1 wherein said adsorbing agent is a combustion residue of organic substances selected from the group which consists of charcoal, peat, coke and semi-coke.

5. A process according to claim 1, further comprising the step of admixing water vapor with the gas stream during movement past said adsorbing agent.

6. A process according to claim 1 wherein a substantially oxygen-free flushing gas is passed over the adsorbing agent during the desorption step, the recovered oxide being subsequently extracted from said flushing gas by washing the latter with an aqueous liquid.

7. A process according to claim 6 wherein said flushing gas is taken from the gas stream leaving said adsorbing agent.

8. A process according to claim 6 wherein said flushing gas upon having been freed from the oxide is at least partly re-utilized in the desorption step.

9. A process according to claim 6 wherein the oxide is separated from said liquid by heat derived from the heated adsorbing agent by subjecting the latter to a cooling step.

10. A process according to claim 9 wherein at least part of the cooled adsorbing agent is recirculated into contact with said gas stream.

References Cited in the file of this patent

UNITED STATES PATENTS

| | | |
|---|---|---|
| 1,433,969 | Noyes et al. | Oct. 31, 1922 |
| 1,520,437 | Pipkin | Dec. 23, 1924 |
| 1,610,288 | Jones et al. | Dec. 14, 1926 |
| 2,384,311 | Kearby | Sept. 4, 1945 |
| 2,568,396 | James | Sept. 18, 1951 |
| 2,674,338 | Lindsay et al. | Apr. 6, 1954 |

OTHER REFERENCES

Mellor: "Comprehensive Treatise on Inorganic and Theoretical Chemistry," Longmans, Green and Co., New York, vol. 8, 1928, page 418.

Hackh's Chemical Dictionary, The Blakiston Company, Phila., 3rd ed., 1944, pages 573 and 580.